United States Patent
Talbi et al.

(10) Patent No.: US 7,452,180 B2
(45) Date of Patent: Nov. 18, 2008

(54) GRAIN TANK UNLOADER AND CLEAN OUT CONTROL

(75) Inventors: Aziz Talbi, Davenport, IA (US); Jeffrey D. Frego, Willow Street, PA (US); John B. Crego, New Holland, PA (US)

(73) Assignee: CNH America LLC, New Holland, PA (US)

( * ) Notice: Subject to any disclaimer, the term of this patent is extended or adjusted under 35 U.S.C. 154(b) by 433 days.

(21) Appl. No.: 10/978,024

(22) Filed: Oct. 29, 2004

(65) Prior Publication Data

US 2006/0104770 A1    May 18, 2006

(51) Int. Cl.
*A01D 34/00* (2006.01)

(52) U.S. Cl. ...................................... 414/812

(58) Field of Classification Search ............. 414/505, 414/526, 528, 812; 15/14.6, 16.6
See application file for complete search history.

(56) References Cited

U.S. PATENT DOCUMENTS

| | | | | |
|---|---|---|---|---|
| 3,834,564 | A | 9/1974 | Laurent et al. | 214/83.26 |
| 3,938,684 | A | 2/1976 | Quoiffy et al. | 214/521 |
| 4,029,228 | A | 6/1977 | Shaver | 214/522 |
| 4,289,440 | A | 9/1981 | Walberg | 414/523 |
| 4,322,933 | A | 4/1982 | Seymour | 56/10.2 |
| 4,337,611 | A | 7/1982 | Mailander et al. | 56/10.2 |
| 4,522,553 | A | 6/1985 | Nelson et al. | 414/526 |
| 4,874,283 | A | 10/1989 | Hurley, Jr. et al. | 414/504 |
| 5,393,937 | A * | 2/1995 | Etherington et al. | 177/141 |
| 5,409,344 | A | 4/1995 | Tharaldson | 414/505 |
| 5,496,215 | A * | 3/1996 | Underwood et al. | 460/114 |
| 5,584,640 | A | 12/1996 | Johnson | 414/502 |
| 6,233,911 | B1 * | 5/2001 | Dillon | 56/14.6 |
| 6,330,767 | B1 | 12/2001 | Carr et al. | 52/192 |
| 6,430,904 | B1 | 8/2002 | Coers et al. | 56/10.3 |
| 6,835,130 | B2 | 12/2004 | Pope | |
| 2002/0011060 | A1 | 1/2002 | Dillon | 56/16.6 |

* cited by examiner

*Primary Examiner*—Charles A Fox
(74) *Attorney, Agent, or Firm*—Michael G. Harms; John William Stader; Patrick M. Sheldrake

(57) ABSTRACT

An unloader control for an unloader conveyor and grain tank conveyor of an agricultural combine, which, when an unload command is received, will automatically initiate operation of the unloader conveyor to commence conveying grain in an inlet end thereof toward the outlet end thereof so as to allow smooth transition of grain from the grain tank conveyer to the inlet end of the unloader conveyor, then automatically initiate operation of the grain tank conveyor for moving grain into the inlet end of the unloader conveyor, and, when a clean out command is received during operation of the unloader conveyor and the grain tank conveyor, will automatically cease operation of the grain tank conveyor, then, after a sufficient time period for the unloader conveyor to convey substantially all of any grain therein through the outlet end, automatically cease operation of the unloader conveyor.

5 Claims, 5 Drawing Sheets

GRAIN TANK UNLOADER AND CLEAN OUT CONTROL

TECHNICAL FIELD

This invention relates generally to an unloader control for a grain tank of an agricultural combine, and more particularly, to a control for grain tank unloading and clean out which provides an operating routine for reducing start up torque loading and grain damage at commencement of grain unloading, a routine for cleaning out the unloader conveyor after unloading, and which can provide protection for a grain tank conveyor drive under severe loading conditions.

BACKGROUND

Grain tanks of combines commonly have an associated unloader conveyor operable for conveying grain from the grain tank to another location such as to a grain truck or wagon. An unloader conveyor typically includes an elongate, enclosed tubular housing containing a helical auger and is oriented horizontally or at a small acute angle to horizontal. The unloader conveyor is typically pivotally supported in cantilever relation by a lower end of an upstanding or vertical lower unloader conveyor section including an inlet opening disposed in or adjacent to the grain tank. The unloader conveyor is typically pivotable between a stored position extending along the combine, and a sidewardly extending unloading position. The unloader can be of any length, but will typically have a length sufficient to extend just beyond the end of a header of the combine. Grain tanks additionally typically include at least one grain tank conveyor including an auger adjacent to the bottom of the grain tank and extending into the inlet opening of the lower unloader conveyor for conveying grain into the unloader.

After use, if the unloader is not cleaned out, grain remaining in the unloader conveyor has been observed to have a tendency to settle in the enclosed lower region of the upstanding or vertical unloader conveyor section around the lower end of the auger therein and the adjacent end of the grain tank conveyor auger extending into the inlet opening. As a result, a problem that can occur if the grain tank and unloader augers are started simultaneously, or the grain tank auger is started first, is that the grain tank auger can force or pack the grain into and against the grain in the lower unloader housing, thereby causing grinding, cracking of and other damage to the grain. Also, if the augers are commonly driven and loaded with grain, the start up torque and power required will be higher than if the augers are started separately. As another problem or shortcoming, if the unloader conveyor is loaded with grain when pivoted between the sidewardly extending unloading position and the stored position, greater loads and stress are placed thereon and on the supporting structure thereof compared to if the unloader is empty. As the width of combine headers increase, it is anticipated that the length of unloader conveyors will necessarily also increase as will the amount and weight of grain remaining therein after use. As a result, the stress on the supporting structure when the unloader is in the unloading position and moving thereto and therefrom will also be increased. As still another possible problem, if the unloader auger should stall, for instance, due to a mechanical problem with the unloader drive, formation or induction of a slug of grain in the unloader tube, and the grain tank auger continues to operate, the inlet of the unloader can be packed with grain, which can result in excessive grain damage and/or damage to the grain tank auger.

Thus, what is sought is a grain tank unloader control and drive which overcomes many of the problems and shortcomings set forth above.

SUMMARY OF THE INVENTION

What is disclosed is a control for an unloader conveyor and a grain tank conveyor for a grain tank of an agricultural combine, which overcomes many of the problems and shortcomings set forth above. According to a preferred embodiment of the invention, when an unload or first command or input is received by or inputted to the control, the control will automatically initiate operation of the unloader conveyor to commence conveying grain in an inlet end thereof toward the outlet end thereof so as to open or create space or capacity in the inlet end for receiving grain from the grain tank conveyor, then the control will automatically initiate operation of the grain tank conveyor for moving grain into the inlet end, the space or capacity in the unloader conveyor created by the earlier initiation of operation thereof allowing the grain from the grain tank conveyor to smoothly move and transition into the inlet end of the unloader conveyor and the grain flow therein, without being forced, or packed, or compacted into and against the grain in the inlet end, such that problems including grinding and cracking of the grain are significantly reduced or avoided. When a second or clean out command is received during operation of the unloader conveyor and the grain tank conveyor, the control will automatically cease operation of the grain tank conveyor, then, after a sufficient time period for the unloader conveyor to convey all or a substantial portion of any grain therein through the outlet end, the control will automatically cease operation of the unloader conveyor.

According to a preferred aspect of the invention, the unloader includes an unloader drive controllably operable or engageable for rotatably driving the unloader conveyor, and a device controllably operable for connecting the grain tank conveyor to a rotating power source, which can be, for instance, the unloader drive, or an engine output, a transmission, or the like, and for disconnecting the grain tank conveyor from the power source. The control also includes a controller operably connected to the unloader drive and to the device for controlling them. The controller is automatically operable when the first or unload command or input is received for initiating operation of the unloader drive, and, after a predetermined first delay, for initiating operation of the device for connecting the grain tank conveyor in rotatably driven relation to the rotating power source. When the second or clean out command or input is received, the controller will control the device for automatically disconnecting the grain tank conveyor from the driving power source and after a predetermined delay, ceasing operation of the unloader drive.

According to another preferred aspect of the invention, the unloader drive can be, for instance, a chain drive, belt drive and/or shaft drive connectable to a source of rotatable power such as a fluid or electric motor, or an output of the engine of the combine by a clutch such as a fluid or electrically controlled clutch. The controller can be, for instance, a fluid and/or processor based controller controllably connected to the unloader drive, the device and an input device. The device can be, for instance, a clutch such as a fluid or electrically controlled clutch operable in a first operating mode for drivingly connecting the unloader drive to the grain tank conveyor and in a second operating mode for disconnecting the unloader drive from the grain tank conveyor. The device can alternatively include a separate motor such as a fluid or electric motor operable for driving the grain tank conveyor. The input device can be, for instance, an operator controlled input device such as a switch or touch screen located in the operator cab of the combine or elsewhere. The first input can be, for instance, an unload command from the input device and the second input can be, for instance, a clean out command. Optionally, the controller can be programmed or an interlock or other device provided to allow the unload command to be enabled only when the unloader conveyor is in an unloading position, and the unloader to be moved from an unloading position only after clean out. Also optionally, the delays can be fixed or variable, for instance, as a function of drive and/or engine speed.

According to still another preferred aspect of the invention, the unloader drive can provide an anti-stall feature, which automatically discontinues operation of the grain tank conveyor or disconnects or disengages it from its drive, to prevent packing and possible grain and/or conveyor damage in the event of problems in the unloader conveyor, such as drive failure and/or induction or creation of a slug or blockage in the unloader conveyor.

DETAILED DESCRIPTION OF THE PREFERRED EMBODIMENTS

Figure 1:
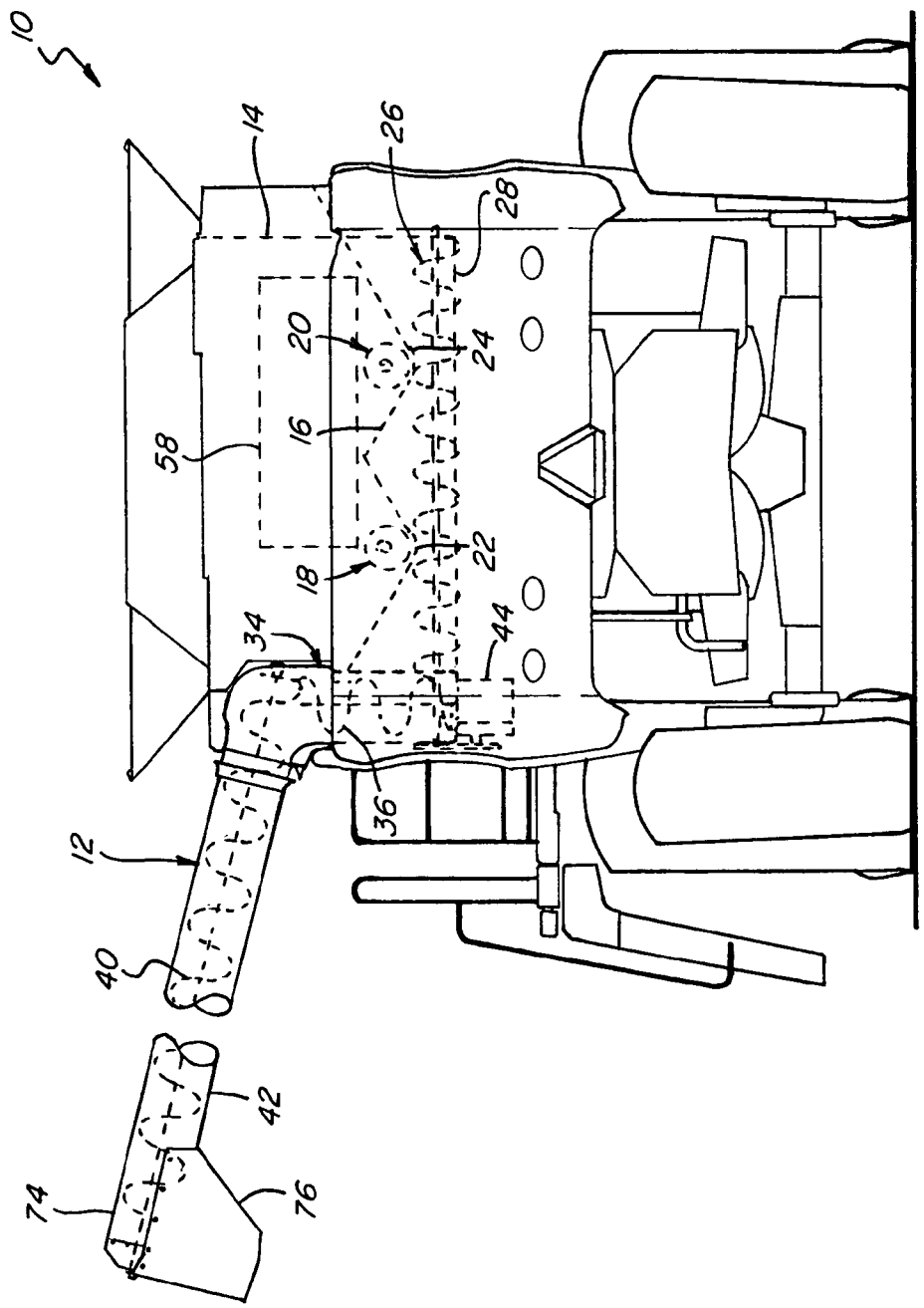
FIG. 1 is a simplified rear view of a representative agricultural harvesting machine, including an unloader and an unloader control according to the invention for unloading grain from a grain tank of the machine.

Referring now the drawings, in FIG. 1, a representative agricultural harvesting machine 10 is shown, including an unloader 12 operable for unloading grain from a grain tank located on an upper region of harvesting machine 10. Here, harvesting machine 10 is depicted as a well known, commercially available combine operable for harvesting a wide variety of grains, including, but not limited to, wheat, beans, corn, rice, and the like. Typically, the grain is harvested and threshed from stalks, pods, or other crop material, and conveyed away from a cleaning system of machine 10 by a clean grain conveyor to a grain elevator (not shown). The grain elevator then lifts the grain upwardly to a grain delivery conveyor which is operable for discharging the grain into grain tank 14 onto a floor 16 thereof. When grain tank 14 is filled with grain, or filled to a desired level, unloader 12 can be operated for unloading the grain from tank 14, onto the ground, or into a wagon, truck or other vehicle, or a bin or the like.

Figure 2:
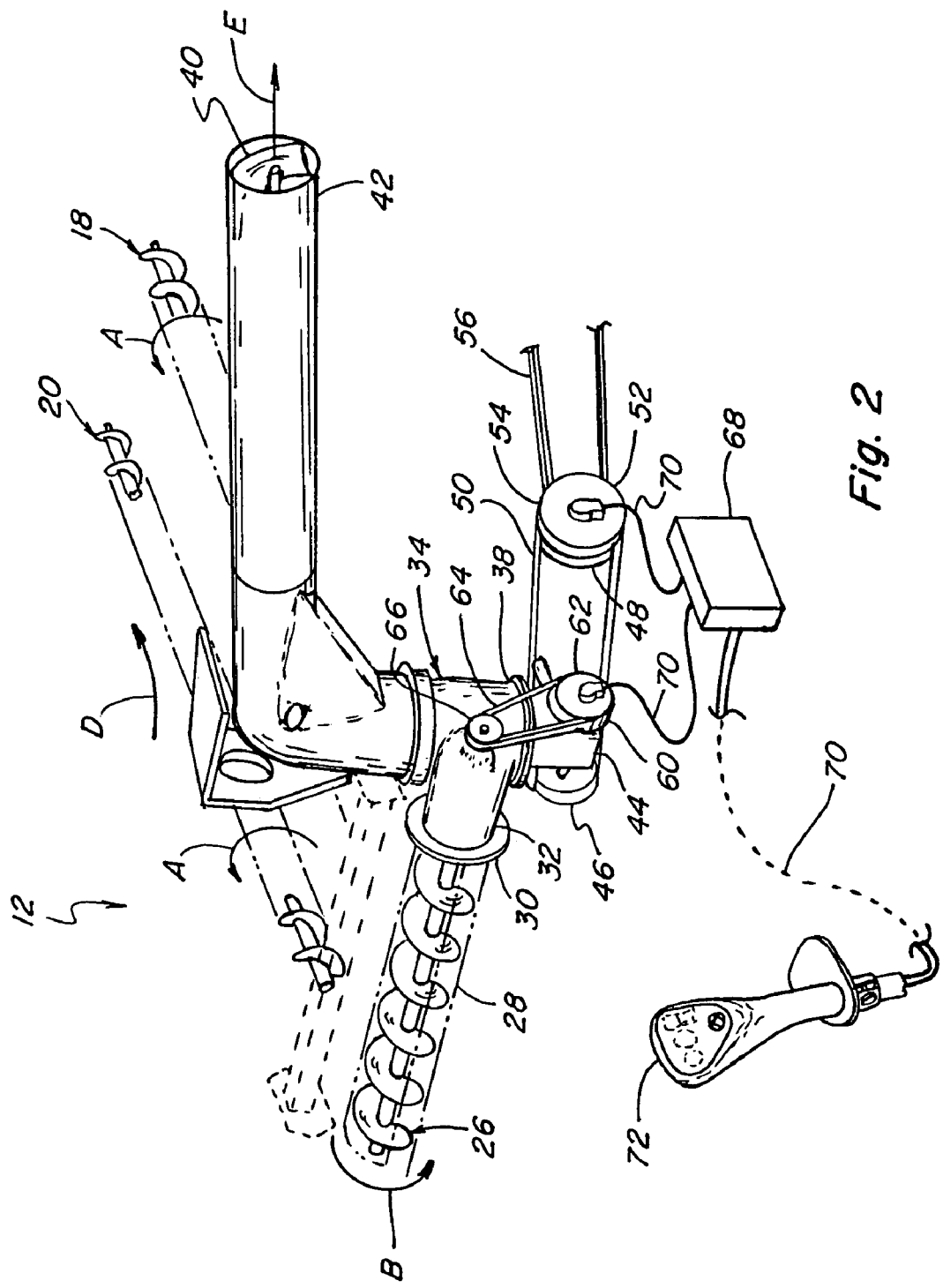
FIG. 2 is a simplified perspective view of the unloader of FIG. 1.

Referring also to FIG. 2, grain tank 14 may include a pair of grain tank conveyors 18 and 20 disposed in forward and rearwardly extending troughs 22 and 24 in floor 16 (FIG. 1). Grain tank conveyors 18 and 20 are each a generally horizontal elongate helical auger rotatable in a direction denoted by arrows A in FIG. 2 for instance, by being directly coupled, through a set of gearbox assemblies (not shown), to a main grain tank conveyer 26, or by a suitable drive or drives such as a belt, chain and/or shaft drive or a fluid or electric motor (not shown) for conveying grain through the respective trough 22 or 24 to a main grain tank conveyor 26. Main grain tank conveyor 26 comprises another generally horizontal elongate helical auger, located in a side to side extending trough 28 at the forward end of troughs 22 and 24 and grain tank 14. Here, it should be noted that the configuration of grain tank 14 shown is intended to be representative of a wide variety of grain tank configurations, and a grain tank can be configured differently, for instance, so as to have a floor which slopes down to directly to one or more main conveyors 26 (not shown) which feed to the unloader, thereby eliminating conveyors 18 and 20.

Figure 3:
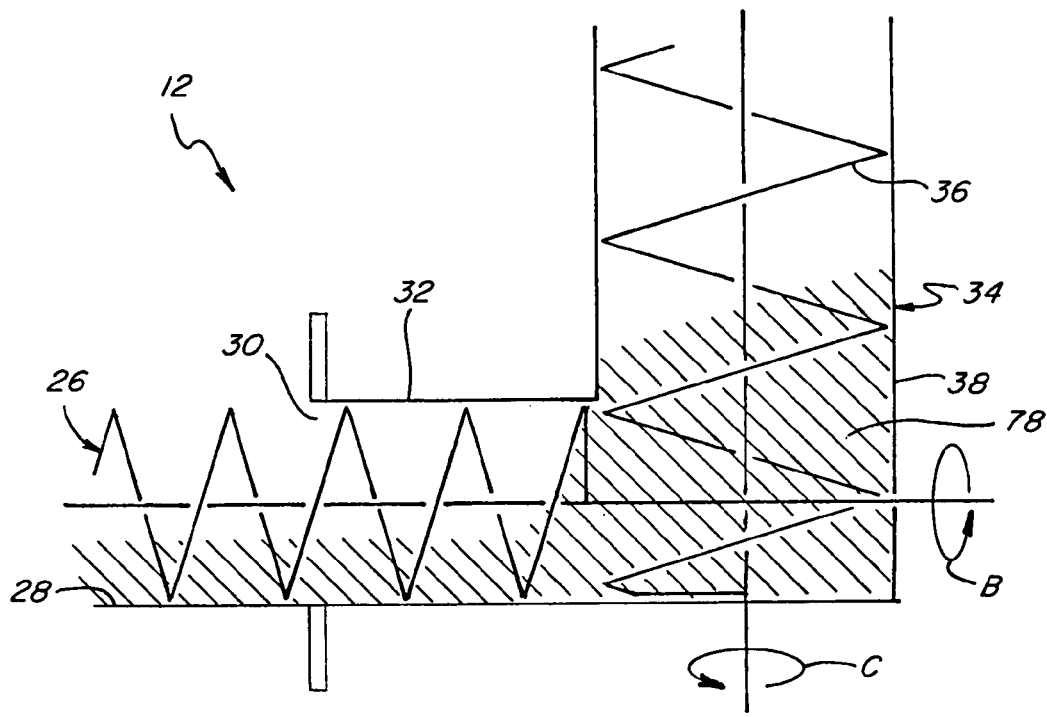
FIG. 3 is a simplified schematic representation of conveyors of the unloader of FIG. 1 shown in a first state containing settled grain.
Figure 4:
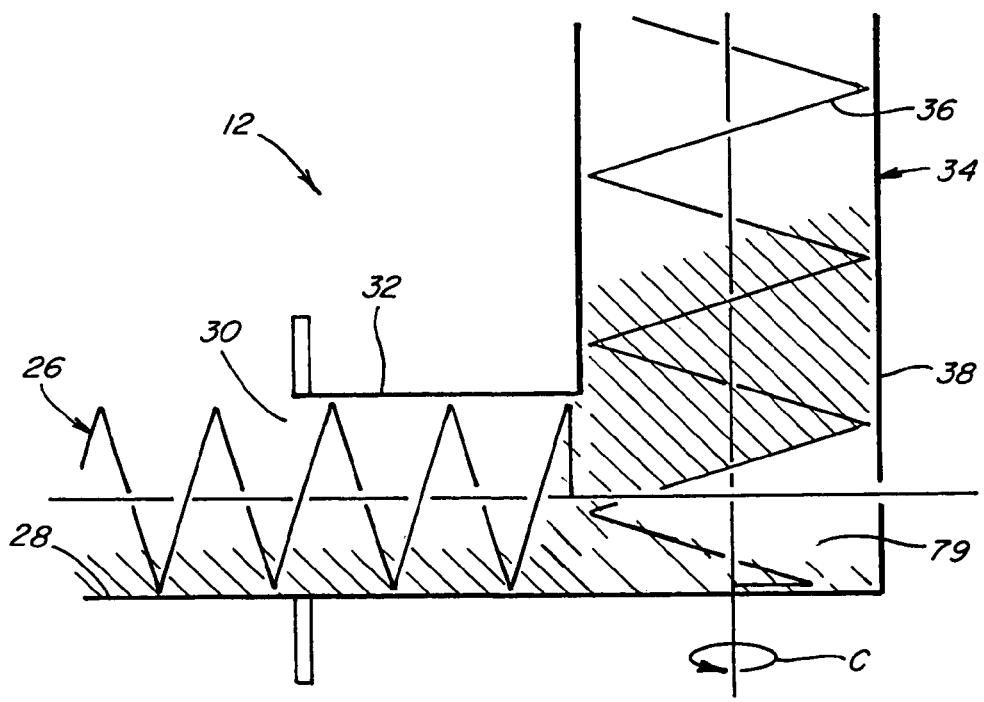
FIG. 4 is another simplified schematic representation of conveyors of the unloader of FIG. 1 shown in a second state wherein the settled grain has been conveyed away.

Referring also to FIGS. 3 and 4, main grain tank conveyor 26 is rotatable in a direction denoted by arrow B (FIGS. 2 and 3), for conveying the grain from conveyors 18 and 20 along trough 28 into an inlet opening 30 in an inlet end 32 of an unloader conveyor 34 of unloader 12. Unloader conveyor 34 includes an elongate upwardly or generally vertically extending auger 36 supported for rotation as denoted by arrow C (FIGS. 3 and 4) in an upwardly extending tubular housing 38, and an elongate auger 40 oriented horizontally or at a small acute angle to horizontal, supported for rotation in an elongate tubular housing 42 connected to and forming a continuation of housing 38. Housing 42 and an upper portion of housing 38 are supported in cantilever relation by a lower portion of housing 38 for rotation relative thereto, as denoted by arrow D in FIG. 2, between an unloading position as shown, and a rearwardly extending stored position at about a 90 degree angle to the unloading position, in the well known manner. Auger 40 is connected to auger 36 for rotation thereby in a suitable manner, such as by bevel gears, a Hooke's joint, or the like, also in the well known manner. Auger 36 is connected in rotatably driven relation to an output of an unloader drive 44, which can include, for instance, a right angle gear drive having an input pulley 46 connected in rotatably driven relation to a pulley 48 by a belt 50. Pulley 48 is connected to an output of an unloader drive clutch 52 having an input pulley 54 which is driven by a belt 56 which, in turn, is rotated by an output of an engine 58 (FIG. 1) of machine 10 or another rotatable power source, in the well known conventional manner. Unloader drive clutch 52 can be, for instance, a well known commercially available fluid or electrically actuated clutch controllable in the well known manner by a solenoid or the like (not shown). Here, unloader drive 44 additionally includes a second output rotatably drivingly connected to an input of a device 60 which includes an output pulley 62 connected by a belt 64 to a pulley 66 connected to grain tank conveyor 26. Device 60 is selectably operable for connecting drive 44 in rotatably driving relation to belt 64 for drivingly rotating grain tank conveyor 26. Device 60 can be, for instance, another well known commercially available fluid or electrically actuated clutch conventionally controllable by a solenoid or the like. As alternatives, it should be understood that it is contemplated that grain tank conveyor 26 and unloader conveyor 34 can be individually selectably driven, using one or more other drives, including, but not limited to, electric or fluid motors, or belt, chain and/or shaft drives or the like, as desired or required for a particular application, it only being required for the present control that conveyors 26 and 34 be individually or separately controllable.

Unloader 12 additionally includes an unloader controller 68 which can be, for instance, a well known commercially available processor based controller and/or a fluid based controller connected in operably controlling relation to clutch 52 and device 60, by, for instance, one or more conductive paths as represented by lines 70. Controller 68, in turn, can be operably connected to one or more input devices 72 in a suitable manner such as by one or more conductive paths represented by another line 70, for receiving inputs or input commands therefrom, also in the well known manner. As a non-limiting example, input device 72 can be a switch such as a momentary rocker switch movable to positions including an unloading position and a clean out position, a touch screen, or the like, located in an operator cab of machine 10 or elsewhere.

Generally, in operation, grain tank conveyors 18 and 20 will convey grain in grain tank 14 to main grain tank conveyor 26, which will convey the grain into inlet opening 30 in inlet end 32 of unloader conveyor 34. Operation of unloader conveyor 34 will convey the grain upwardly and through housings 38 and 42 as denoted by arrow E in FIG. 2 to an outlet or free end 74 thereof (FIG. 1) where the grain will be discharged from the conveyor through an outlet opening 76. The grain can be discharged into any receptacle such as a wagon or truck, or onto the ground or another surface or location (not shown), as desired.

Referring now particularly to FIG. 3, it has been observed that after use and cessation of operation of unloader conveyor 34, if not cleaned out, grain will remain in, and have a tendency to slide downwardly between the flights of auger 36 and the inner surfaces of housings 38 and 42, so as to settle in the lower region or bottom of housing 38 of unloader conveyor 34, adjacent to or in the vicinity of inlet end 32 and inlet opening 30, as denoted by densely shaded region 78. Grain will also be present in trough 28 of grain tank conveyor 26 as also denoted by a shaded region. As a result, if grain tank conveyor 26 and unloader conveyor 34 are simultaneously started, or conveyor 26 is started before conveyor 34, it is possible that there will be insufficient space in the lower region of housing 38 for receiving grain conveyed thereto by conveyor 26, so as to result in compression and compaction of the grain sufficient to grind and crack and otherwise damage some or all of the grain in that region, which is undesirable. Additionally, if initiation of operation of conveyors 26 and 34 is simultaneous, relatively high startup torque and loads on unloader drive 44 can occur, with the potential for damaging components of the drive, such as clutch 52, device 60, and belts 50, 56 and 64. As a result, it is desirable to avoid such grain damage and startup torque requirements.

To overcome or at least mitigate these problems, when an unload command or input is received, unloader controller 68 is operable for initiating operation of unloader conveyor 34 and then, after a delay, grain tank conveyor 26, to create or open a space or capacity in the lower region of housing 38 for receiving grain. By capacity, what is meant is the capability for receiving and smoothly transitioning the incoming grain from the grain tank conveyor into the lower region of housing 38. This can result from actual opening of space or spaces in the lower region of housing 38 or a decrease in the density of the grain therein as a result of the rotation of auger 36 and the conveying of the existing grain in housing 38 upwardly thereby, as illustrated by the less dense shading and open space at the bottom of housing 38, as generally denoted at 79 in FIG. 4. Thus, the delay can be determined such that the amount of grain initially conveyed upwardly from the lower region of housing 38 will closely correspond to the amount of grain to be initially discharged therein by the grain tank auger, or can be longer, as desired to ensure adequate capacity to avoid the occurrence of grain to grain grinding and compaction and resultant damage such as abrasion, bruising and cracking, and also lower startup torque loads on unloader drive 44.

Additionally, to decrease the amount of grain that collects in the lower region of housing 38, and also to decrease the weight of unloader 12 when moved from the unloading position to the stored position, when a clean out command or input is received by unloader controller 68, controller 68 is operable to cease operation of grain tank conveyor 26 while continuing operation of unloader conveyor 34, such that all or a substantial portion of grain contained in housings 38 and 42 is conveyed or discharged therefrom.

Figure 5:
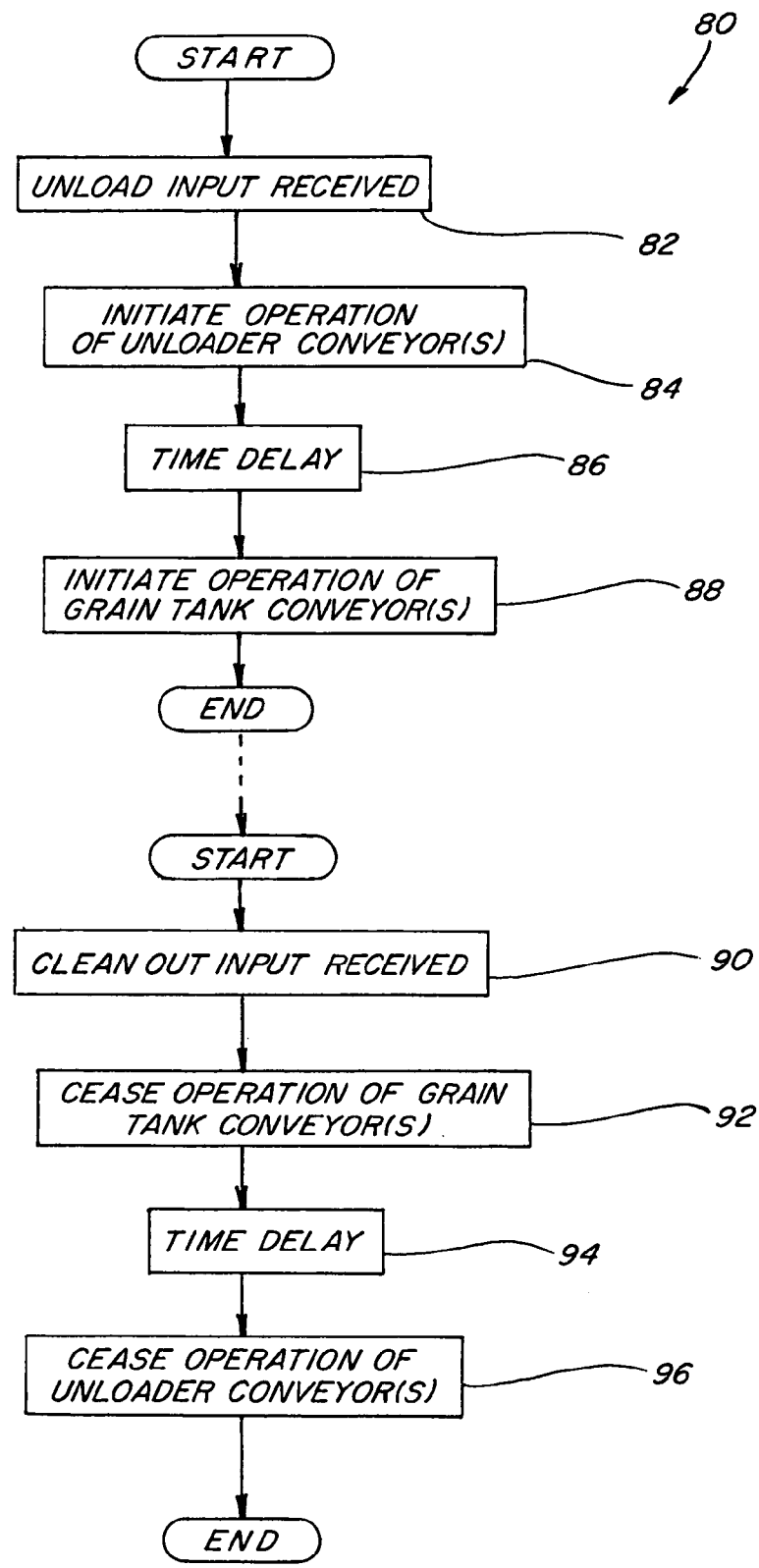
FIG. 5 is a high level flow diagram showing operating steps of the control of the invention.

Referring also to FIG. 5, a high level flow diagram 80 showing steps of operation of unloader 12 according to the present invention, is shown. Referring to diagram 80, when an unload command or input from input device 72 is received by unloader controller 68, controller 68 will initiate operation of unloader conveyor 34, as denoted at block 84. Then, after a time delay sufficient for unloader conveyor 34 to open a space or capacity in the bottom region of housing 38 for receiving grain, controller 68 will initiate operation of at least grain tank conveyor 26, as denoted at block 88. As a result, grain will be conveyed by conveyor 26 smoothly into unloader conveyor 34 without the occurrence of potentially damaging compaction and grinding of the grain. Subsequently, when it is desired to cease the unloading operation, input device 72 can be operated to output an unload stop or similar command to controller 68. Then, if a clean out command has not been inputted to the unloader, when a subsequent unload command or input is received, the above-discussed steps, represented by blocks 82, 84, 86 and 88 will be repeated. Alternatively, or subsequently, if a clean out command or input from input device 72 is received by controller 68, as denoted at block 90, controller 68 will cease operation of at least grain tank conveyor 26, as denoted at block 92, then, after a time delay denoted at block 94 sufficient for unloader conveyor 34 to convey at least a substantial portion or all of the grain therefrom and discharge it through outlet opening 76, controller 68 will cease operation of unloader conveyor 34, as denoted at block 96. As a result, only insignificant amounts or no grain will remain in housings 38 and 42 to settle in the lower region of housing 38. Unloader 12 will thus be lighter and cause less loading and stress on supporting structure when in the unloading position (FIG. 1) and when moved to the rearwardly extending stored position.

Here, it should be noted that the time required for forming or clearing adequate space or capacity in the lower region of housing 38 for smoothly receiving and transitioning the incoming grain into the lower region without packing or forcing the grain into or against the grain in the lower region and resultant damage, and also the time required for clean out, can vary according to the rotation or operational speed of the involved conveyors. In turn, the rotational speed of the conveyors will typically be a function of the speed of unloader drive 44, which in turn, is typically a function of the engine speed. Therefore, it is contemplated that the time delays denoted at blocks 86 and 94, respectively, should be adequate for performing the desired function under the slowest operating speeds of the involved conveyors. It is also contemplated that either or both delays can be variable, either or both by an operator input or a programming change.

As noted above, grain tank conveyor 26 and unloader conveyor 34 can be individually driven using other drives, including, but not limited to, electric or fluid motors, or belt, chain and/or shaft drives or the like, as desired or required for a particular application. As also noted above, the unloader can have an anti-stall feature, that is, a capability to automatically discontinue operation of the grain tank conveyor or disconnect or disengage it from its drive, to prevent packing and possible grain and/or conveyor damage in the event of problems in the unloader conveyor, such as drive failure and/or induction or creation of a slug or blockage in the unloader conveyor.

Figure 6:
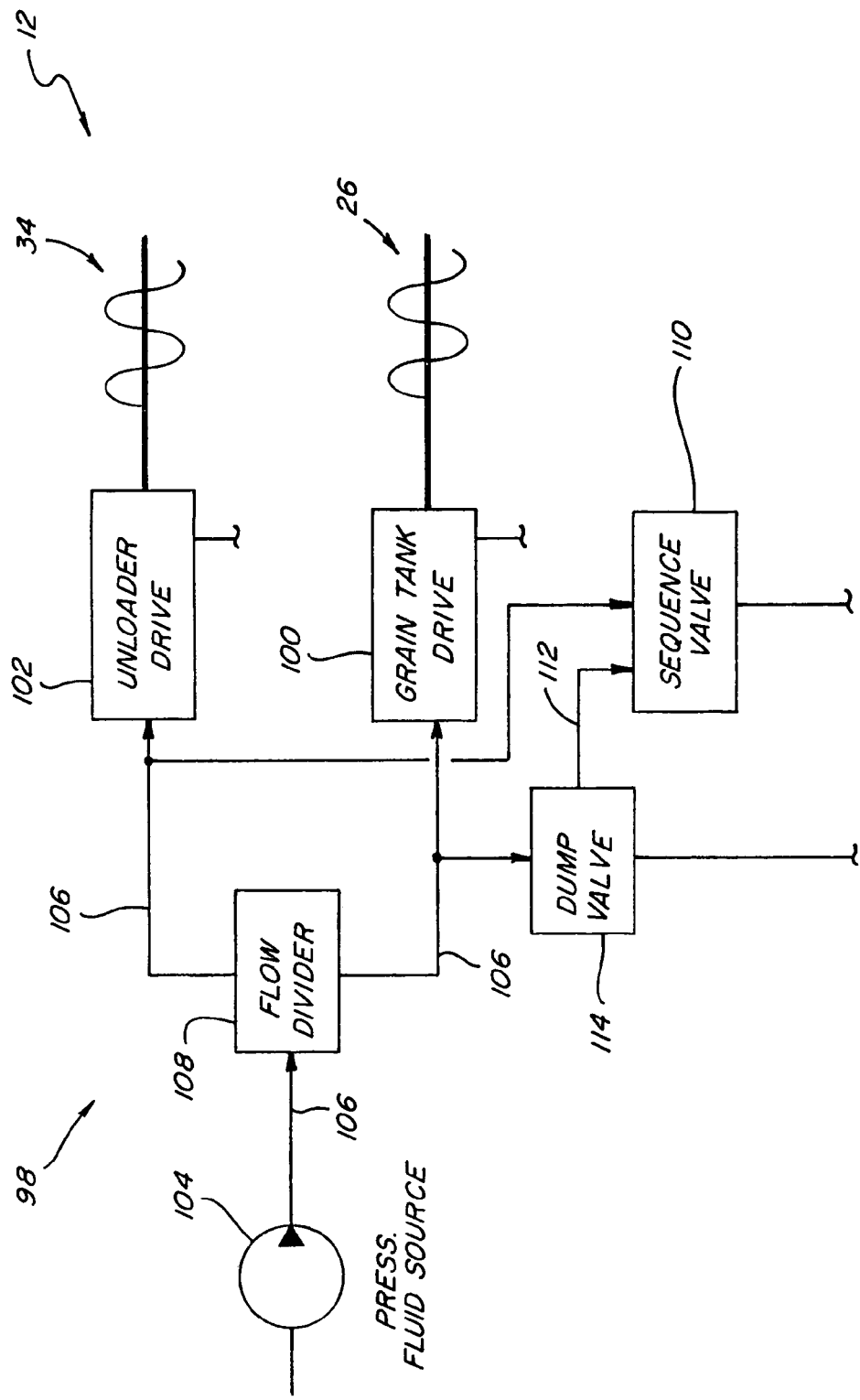
FIG. 6 is a simplified schematic representation of an alternative drive arrangement for unloader and grain tank conveyors.

Referring also to FIG. 6, an alternative drive arrangement 98 for unloader 12 is shown which includes separate drives for grain tank conveyor 26 and unloader conveyor 34, and which provides an anti-stall feature. Drive arrangement 98 includes a grain tank drive 100 which preferably includes a commercially available fluid motor connected in rotatably driving relation to grain tank conveyor 26. Drive arrangement 98 includes an unloader drive 102 which also preferably includes a commercially available fluid motor, connected in rotatably driving relation to grain tank conveyor 26. Drives 100 and 102 are thus able to drive conveyors 26 and 34 separately. Drives 100 and 102 are connected to a pressurized fluid source 104, such as a fluid pump as shown, by fluid lines 106. A flow divider 108 is disposed in the fluid lines 106 between drives 100 and 102, and operates to divide the flow thereto. Fluid line 106 leading to unloader drive 102 is also connected to the input port of a sequence valve 110. Sequence valve 110 is operatively connected by a signal line 112 to a signal port of a dump valve 114 connected to fluid line 106 between flow divider 108 and grain tank drive 100. When pressure conditions in the line 106 leading to unloader drive 102 reach a predetermined high level indicative of a stall condition in unloader conveyor 34, for instance, due to induction of a slug of grain or other blockage sufficient to slow down rotation of unloader drive 102 so as to possibly cause significant grain or apparatus damage, sequence valve 110 will output a fluid signal over line 112 to dump valve 114, to cause it to open to divert fluid flow from grain tank drive 100, to interrupt operation of grain tank auger 26. As a result, grain flow to unloader conveyor 34 will be halted, and possible damage to the grain and/or the apparatus will be averted. Then, when the high pressure condition in the line 106 to unloader drive 102 is alleviated, for instance, by passage of the slug of grain or clearance of the blockage, sequence valve 110 will no longer send the signal to dump valve 114 and thus dump valve 114 will close, such that operation of grain tank drive 100 and grain tank conveyor 26 can resume.

It is also contemplated that sequence valve 110 and dump valve 114 can be utilized as a fluid based control according to the present invention to delay the start up of grain tank drive 100 and conveyor 26 until after initiation of operation of unloader drive 102 and unloader conveyor 34, when high torque conditions in the unloader drive 102 are present, as would be indicative and representative of collection and packing of a large amount of grain in the lower inlet region of unloader conveyor 34, as discussed above. More particularly, as discussed above, if conveyor 26 and conveyor 34 are simultaneously started, it is possible that there will be insufficient space in the lower region of the housing of conveyor 34 for receiving grain conveyed thereto by conveyor 26, so as to result in compression and compaction of the grain sufficient to grind and crack and otherwise damage some or all of the grain in that region. To overcome or at least mitigate this problem, when operation of drives 100 and 102 is initiated, if there is high torque on drive 102 as a result of a combination of normal start up torque and a substantial grain build up or collection in unloader conveyor 34, to result in the predetermined pressure level to sequence valve 110, sequence valve 110 will open dump valve 114 to delay operation of grain tank drive 100, until the gain in conveyor 34 is sufficiently moved to cause the pressure to fall below the predetermined level, at which time sequence valve 110 will cause dump valve 114 to close and operation of grain tank drive 100 to be initiated. Such delay will be a function of the predetermined pressure level setting and thus is considered to be predeterminable, and is preferably sufficient for the smooth flow and transition of grain from conveyor 26 into conveyor 34, similarly as provided by the control discussed above.

It will be understood that changes in the details, materials, steps, and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

What is claimed is:

1. A method for unloading grain from a grain tank of an agricultural combine, comprising the steps of:

providing an elongate unloader conveyor including an enclosed housing having an inlet end including an opening for receiving grain, an opposite outlet end including a discharge opening through which the grain can be discharged, an elongate unloader conveyor element extending through the housing between the ends and operable for conveying the grain through the housing from the inlet end and discharging the grain through the discharge opening, the unloader conveyor being pivotable between a stored position beside the combine and an unloading position extending sidewardly therefrom in cantilever relation thereto, and an unloader drive operably controllable for operating the conveyor element;

providing an elongate grain tank conveyor disposed in a bottom region of the grain tank operable for conveying grain therefrom into the opening of the inlet end of the unloader conveyor, and a device operably controllable for operating the grain tank conveyor;

providing a controller operable for controlling the unloader drive and the device;

receiving an unload command by the controller, whereby the controller initiates operation of the unloader drive before initiating operation of the device;

operating the unloader drive when the unloader conveyor is in the unloading position, such that the unloader conveyor will commence conveying grain away from a bottom region of the housing adjacent the inlet end so as provide capacity in the inlet end for a smooth transition of grain from the grain tank conveyer to enter the inlet end;

opening through which the grain can be discharged, an elongate unloader conveyor element extending through the tubular housing between the ends and operable for conveying the grain through the tubular housing from the inlet end and discharging the grain through the discharge opening, a grain tank conveyor extending into the inlet opening from a bottom region of the grain tank and operable for conveying grain from the grain tank into and through the inlet opening into the tubular housing, and a controller for controllably operating the unloader conveyor and the grain tank conveyor, the method comprising the steps of:

operating the unloader conveyor before operating the grain tank conveyor when an unload command is received by the controller, in order to commence conveying grain in the inlet end thereof toward the outlet end to remove grain from a bottom region of the housing and provide capacity in the inlet end for smooth transition of grain from the grain tank conveyer into the inlet end initiating operation of the device by the controller after the unloader conveyor has removed grain from the bottom region of the housing in order to avoid grain to grain grinding and compaction that would otherwise occur if the grain tank conveyor and the unloader conveyor were simultaneously initiated; and operating the grain tank conveyor for conveying grain into the inlet end of the unloader conveyor.

2. The method of claim 1, wherein the device comprises a clutch disposed in connection with the unloader drive and the grain tank conveyor and operable for connecting the unloader drive in driving relation to the grain tank conveyor and disconnecting the unloader drive therefrom.

3. The method according to claim 1, further comprising:

receiving a clean out command by the controller;

stopping operation of the device after the controller has received the clean out command so as to cease feeding of grain into the inlet end while continuing to operate the unloader drive; and stopping the operation of the unloader drive after the unloader conveyor has conveyed the grain in the housing through the outlet end such that the unloader conveyor will be lighter when subsequently moved from the unloading position to the stored position.

4. A method of operation of an unloader for unloading grain from a grain tank of an agricultural combine, the unloader including an elongate unloader conveyor including a tubular housing having an enclosed inlet end including an opening for receiving grain, an outlet end opposite the inlet end and including a discharge; and initiating operation of the grain tank conveyor for conveying grain into the inlet end of the unloader conveyor after the unloader conveyor has removed grain from the bottom region of the housing in order to avoid grain to grain grinding and compaction that would otherwise occur if the grain tank conveyor and the unloader conveyor were simultaneously initiated.

5. The method according to claim 4, further comprising:

receiving a clean out command by the controller during operation of the unloader conveyor and the grain tank conveyor;

stopping operation of the grain tank conveyor while continuing to operate the unloader drive; and stopping operation of the unloader conveyor after the unloader conveyor has conveyed the grain in the housing through the outlet end.

* * * * *